United States Patent [19]

Van Dyke, Jr.

[11] Patent Number: 4,684,589
[45] Date of Patent: Aug. 4, 1987

[54] BATTERY SEAL

[75] Inventor: Ted J. Van Dyke, Jr., Middleton, Wis.

[73] Assignee: Rayovac Corporation, Madison, Wis.

[21] Appl. No.: 826,567

[22] Filed: Feb. 6, 1986

[51] Int. Cl.$^4$ .............................................. H01M 2/08
[52] U.S. Cl. .................................... 429/184; 429/181; 429/54
[58] Field of Search .................... 429/54, 56, 181, 184

[56] References Cited

U.S. PATENT DOCUMENTS

| | | | |
|---|---|---|---|
| 3,802,923 | 4/1974 | Spanur | 429/54 |
| 4,001,044 | 1/1977 | Miyoshi et al. | 429/166 |
| 4,079,172 | 3/1978 | Potts et al. | 429/54 |
| 4,124,738 | 11/1978 | Riedl | 429/56 |
| 4,469,764 | 9/1984 | Schumm, Jr. | 429/86 |
| 4,539,269 | 9/1985 | Malay | 429/54 |
| 4,567,118 | 1/1986 | Connelly | 429/181 X |

FOREIGN PATENT DOCUMENTS

| | | | |
|---|---|---|---|
| 57-36773 | 2/1982 | Japan | 429/184 |
| 2058440 | 4/1981 | United Kingdom | 429/56 |

Primary Examiner—Brian E. Hearn
Assistant Examiner—Stephen J. Kalafut
Attorney, Agent, or Firm—Kenyon & Kenyon

[57] ABSTRACT

A battery seal is disclosed which non-destructively vents gases in response to abnormal pressure buildup, and substantially prevents moisture loss from or oxygen ingress into a battery cell. An airtight, preferably non-conductive plug is pressed downward onto a receiving member such as the top of a battery's container of active ingredients by a crimped battery jacket comprised of material of sufficiently elastic characteristics to regain its original configuration after deformation under temporary pressure.

20 Claims, 1 Drawing Figure

BATTERY SEAL

BACKGROUND OF THE INVENTION

This invention relates to novel battery seals capable of prolonging shelf life of a battery by preventing moisture loss and oxygen ingress, while simultaneously providing a means for venting unusual amounts of gas build-up within the battery cell. The seal thus provides a safer, more effective means for containing a battery's necessary ingredients and/or preventing seepage of by-products of cell storage or discharge.

To provide a combination of functionality and safety, a battery seal should be capable of venting gases on rare occasions when, for reasons such as dead short, heavy load or unusual storage conditions, gas build-up becomes extraordinary. Under normal operating conditions, however, the seal should remain airtight.

It is known that the porous carbon rod of a typical zinc/carbon battery is capable of venting some excess gas. However, this may be quite insufficient when the battery is subjected to high heat or is otherwise used improperly. Porous seals, while able to handle the venting problem, would be undesirable for use as battery seals because they would not be expected to maintain sufficient airtightness under normal operating conditions. They would not, for instance, be expected to properly contain by-products of cell storage and discharge, nor to properly prevent moisture loss or oxygen ingress.

Plastic seals have been used on certain zinc/carbon dry cells, and asphalt has been used as a sealant between the plastic seal and the points within the battery where the seal makes contact. It is believed, for instance, that Matsushita manufactures zinc carbon dry cell batteries with an asphalt seal between the carbon pencil and a plastic seal washer, and that Matsushita has manufactured a product with asphalt at the interface between a seal washer and zinc can. Rayovac, and perhaps Matsushita, uses a solvent dissolved asphalt dispensed on the periphery of a shallow metal container to contact a closure cap and produce an airtight seal. Battery seals such as the Matsushita designs referenced above, however, would not be expected to provide a sufficient means for venting excess gases. A battery's inability to vent excess gas can cause rupture of the battery cell and can render the battery useless. Additionally, the build-up of pressure may, in some types of batteries, cause seepage of by-products and other materials which can be harmful to equipment into which the battery has been placed.

It is therefore an object of the present invention to provide an airtight battery seal which is capable of efficiently venting excess gases within a battery cell before the pressure of such gases reaches a level likely to cause rupture or seepage.

It is a further object of the invention to provide seals capable of venting gases in a non-destructive manner such that the battery remains functional after the venting.

It is a further object of the invention to provide a seal which prolongs battery shelf life by effectively preventing moisture loss from, or oxygen ingress into, the battery.

It is yet another object of the invention to provide a battery seal which is economical to manufacture and install, takes up less space than total asphalt overpour seals and is thoroughly reliable in use.

BRIEF DESCRIPTION OF THE INVENTION

The above objects and other objects are accomplished by providing a battery seal comprising a plug of air-tight material which fits within an open end of a battery jacket and which has a layer of sealant on at least one of its surfaces which face the interior of the battery, wherein the battery jacket is comprised of a material having sufficiently elastic properties to cause the jacket to regain its original shape after slight distortion under a temporary pressure, and wherein the battery jacket is crimped, along its edge which forms said open end, in a manner which causes the jacket to directly or indirectly compress the plug inward onto a receiving member, such that the receiving member contacts the plug, in the region of the sealant, at a pressure which is sufficient to provide an air-tight seal between the plug and receiving member under normal battery storage and operating conditions yet is low enough to allow the plug to move away from the receiving member in response to force exerted on the plug by abnormal gas pressure within the battery. Under normal operating conditions, gas pressure within a battery cell does not substantially exceed atmospheric pressure. Typically, the pressure is less than about 2 pounds per square inch above atmospheric pressure. It is particularly desirable that a seal be capable of venting gasses when the pressure exceeds atmospheric by appreciably more than about 10 pounds per square inch.

The seal of this invention will, under ordinary conditions, be sufficiently air-tight to prevent substantial moisture loss or oxygen ingress and thus sufficiently airtight to prolong the effective life of a battery in which it is installed.

When excessive gas pressure builds up within a battery cell having the seal of this invention, the plug is pressed away from the receiving member, thus creating an opening between the plug and receiving member through which gas can escape. This motion of the plug slightly deforms the crimped portion of the battery jacket which otherwise acts to compress the plug downward onto the receiving member. Because of the elastic properties of the jacket material, the original crimp of the jacket recovers its former shape once excess gases have been vented and once the upward pressure on the plug is released. This recovery of shape by the battery jacket recompresses the plug into position upon the receiving member such that, together with the sealant along the lower periphery of the plug, the plug and receiving member once again form an air-tight seal. Once excessive pressure within the cell has been relieved by venting of the gases in accordance with the instant invention, the seal returns to its original position and remains fully functional.

The invention is further elucidated by the following detailed description of certain preferred embodiments when read in conjunction with the drawing and description thereof.

DETAILED DESCRIPTION OF CERTAIN PREFERRED EMBODIMENTS

Figure 1:
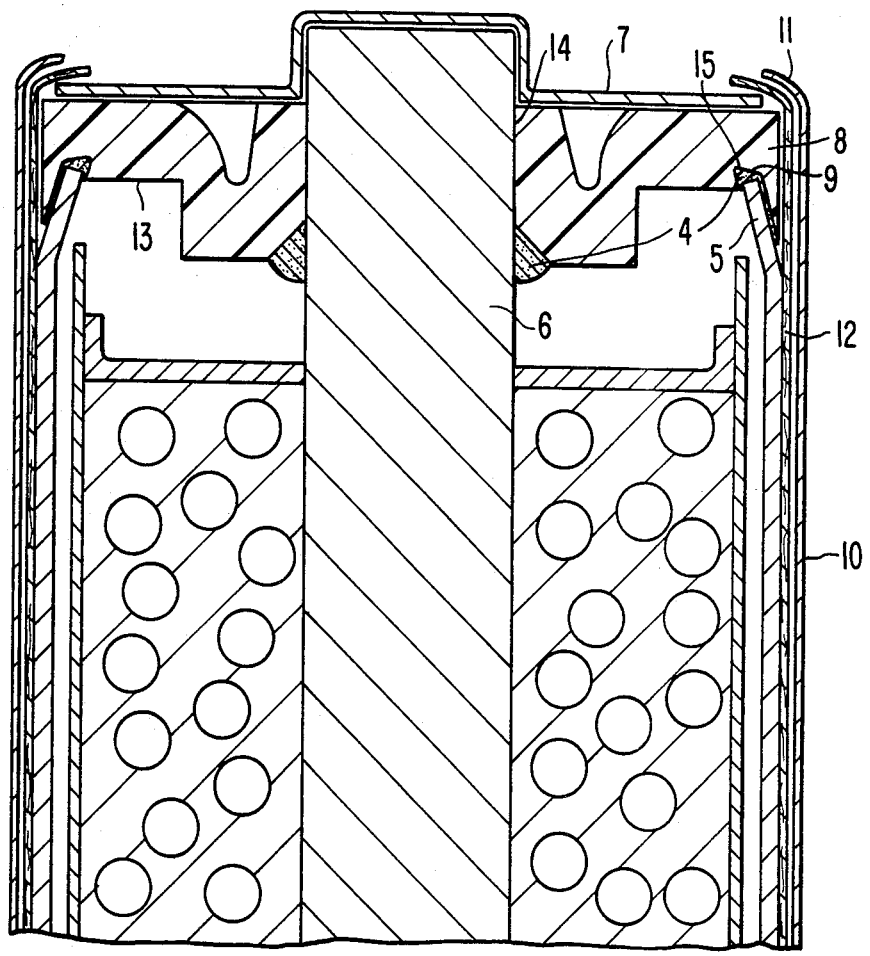

The plug of the invention may be comprised of any air-tight material, preferably material which is electrically non-conductive. Most plastics are suitable. Nylon, polyvinyl chloride, polypropylene, and polyethylene are preferred, especially high density polyethylene. In certain preferred embodiments, the plug is in the form of a washer having a central aperture for enclosing a battery's current collector. When the plug is so configured it can aid in centering the current collector.

The sealant of the invention greatly increases air-tightness relative to direct interfacing of the plug and receiving member, and makes possible the use of high performance mixes such as all zinc chloride mixes. The sealant can be any compound or mixture of compounds capable of forming an air-tight seal. It is preferable that the sealant be dispersable or dissolvable in a solvent carrier such that, when mixed with solvent, the sealant material flows easily and can be readily applied to appropriate surfaces by known mechanical methods. Organic solvents, particularly toluene, methylene chloride and mineral spirits are preferred. It is also preferable that the sealant be somewhat malleable in the dry state after its carrier solvent has evaporated. This enables the seal to be assembled after the sealant has dried. When the seal is assembled after the sealant has dried, there is no problem with the sealant's running during the assembly process. This renders unnecessary the careful control over orientation of the components of the seal during assembly which might otherwise be necessary, and can allow for more efficient mass production. Examples of sealants appropriate for use in the instant invention include but are not limited to asphalt, caulk, epoxy glues, rubber cement, and airplane glues. An especially preferred sealant is blown asphalt.

The crimped battery jacket of the invention may be comprised of any material having elastic properties such that the crimped portion returns to its original shape after minor deformation under pressure and after the deforming pressure has been released. Preferred jacket materials include but are not limited to metal and plastic compounds, preferably hard metal and hard plastics. Seventy-five pound plate steel is especially preferred. When steel is used, it is often desirable to use steel which has been coated with a rust preventative.

The receiving member which contacts the air-tight plug of the invention may be any member within a battery which is located and oriented in a position where it can contact and form an airtight seal with the plug. For instance, it may be the top portion of the battery's container of active ingredients. In certain preferred embodiments, the receiving member may be the zinc container of a typical zinc/carbon dry cell battery.

FIG. 1 is a cross-sectional view of a cylindrical zinc/carbon dry cell battery incorporating a preferred embodiment of the seal of this invention.

There is shown in FIG. 1 a zinc/carbon dry cell battery encased in jacket 10 which is crimped at its edge 11 so as to exert inward pressure, indirectly through paper sleeve 12 and protective cap 7, onto plug 8 which has peripheral groove 9 etched along the periphery of its inner surface 13. Plug 8 is preferably in the form of a washer having centrally located aperture 14 which encircles and fits snugly against current collector 6. The inward pressure exerted indirectly onto plug 8 by the crimp 11 in steel jacket 10 presses plug 8 inward against zinc container 5. The interface 15 between plug 8 and zinc container 5 contains sealant material 4. It is highly desirable that sealant material 4 also be used at the interface between plug 8 and current collector 6. It is desirable that the edge of container 5 slant such that the edge fits into peripheral groove 9 of plug 8. This can improve the airtightness of the seal.

The terms and descriptions used herein are set forth by way of illustration only and are not meant as limitations. Those skilled in the art will recognize that numerous variations are possible within the spirit and scope of the invention as defined in the following claims.

What is claimed is:

1. A battery seal comprising a plug of air-tight material which fits within an open end of a battery jacket and which has a layer of sealant on at least one of its surfaces which face the interior of the battery, wherein the battery jacket is comprised of a material having sufficiently elastic properties to cause the jacket to regain its original shape after slight distortion under a temporary pressure, and wherein the battery jacket is crimped, along its edge which forms said open end, in a manner which causes the jacket to directly or indirectly compress the plug inward onto a receiving member such that the receiving member contacts the plug, in the region of the sealant, at a pressure which is sufficient to provide an air-tight seal between the plug and receiving member under normal battery storage and operating conditions yet is low enough to allow the plug to move sufficiently away from the receiving member in response to force exerted on the plug by abnormal gas pressure within the battery to vent said gas, wherein the plug reseats on the receiving member after said gas is vented to re-form an air-tight seal.

2. The battery seal of claim 1 wherein the plug is comprised of plastic.

3. The battery seal of claim 1 wherein the sealant is of low viscosity when in the presence of a solvent carrier and wherein the sealant remains slightly malleable in the dry state after its carrier solvent has evaporated.

4. The seal of claim 1 wherein the sealant is selected from the group consisting of asphalt, caulk, epoxy glues, rubber cement and airplane glue.

5. The seal of claim 1 wherein the battery jacket is comprising of hard metals or plastics.

6. The seal of claim 1 wherein the battery jacket is comprised of steel.

7. The seal of claim 1 wherein the receiving member is an electrically conductive container of a battery's active ingredients.

8. The battery seal of claim 1 wherein the plug is comprised of electrically non-conductive material.

9. The battery seal of claim 1 wherein the plug is comprised of at least one material selected from the group consisting of nylon, polyvinyl chloride, polypropylene and polyethylene.

10. A battery seal comprising an air-tight electrically non-conductive plug which fits within an open end of a battery jacket, wherein the battery jacket is comprised of a material having sufficiently elastic properties to allow the battery jacket to regain its original configuration after being temporarily deformed under pressure, wherein the plug has a sealant which is slightly malleable in the dry state disposed along the periphery of its inner surface, and wherein the battery jacket is crimped, along its edge which forms said open end, in a manner which directly or indirectly compresses the plug inward onto the battery's container of active materials such that the container contacts the inner periphery of the plug, in the region of the sealant, at a pressure which is sufficient to provide an air-tight seal between the plug and container under normal battery storage and operating conditions yet low enought to allow the plug to move sufficiently away from the container in response to force exerted on the plug by abnormal gas pressure within the battery to vent said gas, wherein the plug reseats on the container after said gas is vented to re-form an air-tight seal.

11. The seal of claim 10 wherein the plug has a peripheral groove etched along its inner surface for receiving sealant, and wherein the receiving member is oriented in such a manner that it contacts the peripheral groove of the plug.

12. The seal of claim 10 wherein the plug is in the form of a washer having a centrally located aperture which encloses a battery's current collector.

13. The seal of claim 12 wherein the plug has a peripheral groove etched along its inner surface for receiving sealant, and wherein the container is oriented in such a manner that it contacts the peripheral groove of the plug.

14. A battery seal comprising a plastic plug which fits within an open end of a battery jacket, wherein the jacket is comprised of hard metal or plastic, wherein the plug has disposed along its inner periphery a layer of sealant selected from the group consisting of asphalt, caulk, epoxy glue, rubber cement and airplane glue, and wherein the jacket is crimped, along its edge which forms said open end, in a manner which causes the jacket to directly or indirectly compress the plug inward onto the battery's container of active materials such that the container contacts the plug along its lower periphery, and in the region of the sealant, at a pressure which is sufficient to provide an air-tight seal between the plug and container under normal battery storage and operating conditions yet low enough to allow the plug to move sufficiently away from the container in response to force exerted on the plug by abnormal gas pressure within the battery to vent said gas, wherein the plug re-seats on the container after said gas is vented to re-form an air-tight seal.

15. The battery seal of claim 14 wherein the plug has a peripheral groove etched along its inner surface, and wherein the container is oriented in such a manner that it contacts the peripheral groove of the plug.

16. A battery seal comprising a plastic washer having a centrally located aperture which encloses a battery's current collector and further having a layer of sealant which is somewhat malleable in the dry state disposed along the periphery of its inner surface, wherein the washer fits within an open end of a battery's steel jacket, wherein the jacket is crimped, along its edge which forms said open end, in a manner which causes the jacket to directly or indirectly compress the washer inward onto the battery's container of active ingredients such that the container contacts the periphery of the washer in the region of the sealant at a pressure sufficient to provide an air-tight seal between the washer and container when gas pressure beneath the washer does not substantially exceed atmospheric pressure yet low enought to allow the washer to move sufficiently away from the container, in response to force exerted on the washer by abnormal gas pressure within the battery, to vent said gas, wherein said washer reseats on said container after said gas is vented to re-form an air-tight seal.

17. A battery seal for a zinc carbon dry cell battery comprising a high density polyethylene washer having a centrally located aperture which encloses a battery's current collector wherein the washer has a layer of asphalt disposed along the periphery of its lower surface, and wherein the washer fits within an open end of a battery's steel jacket, wherein the jacket is crimped, along its edge which forms said open end, in a manner which causes the jacket to directly or indirectly compress the washer inward onto the battery's zinc container such that the zinc container contacts thw lower periphery of the washer, in the region of the asphalt, at a pressure which is both sufficient to provide an air-tight seal between the washer and zinc container under conditions wherein gas pressure within the battery does not exceed atmospheric pressure by substantially more than about 2 pounds per square inch, and is also low enough to allow the washer to move sufficiently away from the zinc container in response to force exerted on the washer when gas pressure within the battery builds to more than about 10 pounds per square inch in excess of atmospheric pressure to vent said gas wherein said washer reseats on said container after said gas is vented to re-form an air-tight seal.

18. The battery seal of claim 17 wherein a paper jacket surrounds the exterior of the container and seal just inside of the battery jacket, and wherein a protective cap fits over the plug.

19. The seal of claim 17 wherein the plug has a peripheral groove etched along its inner surface for receiving sealant, and wherein the container is oriented in such a manner that it contacts the peripheral groove of the plug.

20. The seal of claim 17 wherein the plug is comprised of polyethylene, the battery jacket is comprised of 75 pound plate steel, and the sealant is comprised of blown asphalt.

* * * * *

UNITED STATES PATENT AND TRADEMARK OFFICE
CERTIFICATE OF CORRECTION

PATENT NO. : 4,684,589

DATED : August 4, 1987

INVENTOR(S) : Van Dyke, Jr.

It is certified that error appears in the above-identified patent and that said Letters Patent is hereby corrected as shown below:

Col. 4, Line 38, delete "comprising" and insert --comprised--.

Col. 4, Line 66, delete "enought" and insert --enough--.

Col. 6, Line 6, delete "enought" and insert --enough--.

Col. 6, Line 22, delete "thw" and insert --the--.

Signed and Sealed this

Fifth Day of January, 1988

Attest:

DONALD J. QUIGG

*Attesting Officer*  *Commissioner of Patents and Trademarks*